United States Patent
Kim et al.

(10) Patent No.: US 10,116,009 B2
(45) Date of Patent: Oct. 30, 2018

(54) BATTERY PACK INCLUDING INSERTED TYPE BMS ASSEMBLY

(71) Applicant: LG CHEM, LTD., Seoul (KR)

(72) Inventors: Juhan Kim, Daejeon (KR); Taeyeop Kim, Daejeon (KR); Jin-Kyu Shin, Daejeon (KR); Bum Hyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/022,862

(22) PCT Filed: Sep. 18, 2014

(86) PCT No.: PCT/KR2014/008685
§ 371 (c)(1),
(2) Date: Mar. 17, 2016

(87) PCT Pub. No.: WO2015/046804
PCT Pub. Date: Apr. 2, 2015

(65) Prior Publication Data
US 2016/0226108 A1    Aug. 4, 2016

(30) Foreign Application Priority Data

Sep. 24, 2013    (KR) .................. 10-2013-0113018

(51) Int. Cl.
*H01M 10/42*    (2006.01)
*H01M 2/10*     (2006.01)
(Continued)

(52) U.S. Cl.
CPC ....... *H01M 10/425* (2013.01); *H01M 2/1077* (2013.01); *H01M 2/34* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 4,153,127 A * | 5/1979 | Klink | ...................... | H05K 7/18 180/65.1 |
| 2005/0084748 A1 | 4/2005 | Miller et al. | | |

(Continued)

FOREIGN PATENT DOCUMENTS

| | | |
|---|---|---|
| EP | 2587565 A1 | 5/2013 |
| JP | 2012-9311 A | 1/2012 |

(Continued)

OTHER PUBLICATIONS

BBC website at http://www.bbc.co.uk:80/bitesize/standard/physics/using_electricity/behind_the_wall/revision/1/ (archive.org dated Feb. 2013).*

(Continued)

*Primary Examiner* — Yoshitoshi Takeuchi
(74) *Attorney, Agent, or Firm* — Birch, Stewart, Kolasch & Birch, LLP (57) ABSTRACT

Disclosed herein is a battery pack configured to have a structure including at least one battery module having a structure in which a plurality of unit cells or a plurality of unit modules, each of which includes a plurality of unit cells, is electrically connected to each other, a battery pack case in which the battery module is received, an inner cartridge for fixing the battery module in the battery pack case, and a battery management system (BMS) assembly including a BMS circuit board for monitoring and controlling operation of the battery pack and a BMS case in which the a BMS circuit board is mounted, the BMS assembly being mounted in the inner cartridge from outside the battery pack in an inserting fashion.

17 Claims, 5 Drawing Sheets

(51) Int. Cl.
*H01M 2/34* (2006.01)
*H01M 10/0525* (2010.01)

(52) U.S. Cl.
CPC ............... *H01M 10/0525* (2013.01); *H01M 2010/4271* (2013.01); *H01M 2200/00* (2013.01); *H01M 2220/10* (2013.01)

(56) References Cited

U.S. PATENT DOCUMENTS

| | | | | |
|---|---|---|---|---|
| 2006/0056142 | A1* | 3/2006 | Takahashi | G06F 1/30 361/679.33 |
| 2010/0330408 | A1* | 12/2010 | Yoon | H01M 2/0262 429/120 |
| 2013/0065087 | A1 | 3/2013 | Kim et al. | |
| 2013/0108905 | A1* | 5/2013 | Murakami | H01M 2/1077 429/90 |
| 2013/0288087 | A1* | 10/2013 | Nomura | H01M 2/1016 429/61 |
| 2014/0017528 | A1* | 1/2014 | Uehara | H01M 2/202 429/61 |

FOREIGN PATENT DOCUMENTS

| | | | | |
|---|---|---|---|---|
| JP | WO2012132134 | * | 10/2012 | ............ H01M 10/42 |
| JP | WO2013011779 | * | 1/2013 | ............ H01M 10/44 |
| JP | 2013-122834 A | | 6/2013 | |
| KR | 10-2012-0076756 A | | 7/2012 | |
| KR | 10-2012-0081402 A | | 7/2012 | |
| KR | 10-2012-0119628 A | | 10/2012 | |
| WO | WO 01/61822 A2 | | 8/2001 | |
| WO | WO 2012/132134 A1 | | 10/2012 | |
| WO | WO 2013/011779 A1 | | 1/2013 | |

OTHER PUBLICATIONS

Extended European Search Report dated Jul. 11, 2016, for European Application No. 14849008.9.
International Search Report for PCT/KR2014/008685 dated Dec. 19, 2014.

* cited by examiner

BATTERY PACK INCLUDING INSERTED TYPE BMS ASSEMBLY

TECHNICAL FIELD

The present invention relates to a battery pack including an inserted type battery management system (BMS) assembly, and more particularly to a battery pack configured to have a structure including at least one battery module having a structure in which a plurality of unit cells or a plurality of unit modules, each of which includes a plurality of unit cells, is electrically connected to each other, a battery pack case in which the battery module is received, an inner cartridge for fixing the battery module in the battery pack case, and a BMS assembly including a BMS circuit board for monitoring and controlling operation of the battery pack and a BMS case in which the a BMS circuit board is mounted, the BMS assembly being mounted in the inner cartridge from outside the battery pack in an inserting fashion.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

In addition, technology related to an electric power storage apparatus that stores electric power and stably supplies the stored electric power to a power system when needed has been developed. The electric power storage apparatus is an apparatus that stores electric power when electric power demand is low and supplies the stored electric power in case of overload or emergency. The electric power storage apparatus provides the effect of improving quality of electric power and energy efficiency. In particular, a market for a household electric power storage apparatus and a middle-sized industrial or commercial electric power storage apparatus has been rapidly expanding as the electric power storage apparatuses are related to smart grid technology.

Meanwhile, in order for a battery pack to provide output and capacity required by a predetermined apparatus or device, it is necessary for the battery pack to be configured to have a structure in which a plurality of unit cells or a plurality of battery modules, each of which includes a plurality of unit cells, is electrically connected to each other in series or in parallel. In addition, it is necessary for the battery pack to be configured to have a structure that is easily extendable and stable as the capacity of the battery pack is increased.

In particular, in a case in which a plurality of battery modules is used to constitute a battery pack, a plurality of members, such as bus bars and power cables, is needed for mechanical fastening and electrical connection between the battery modules, and a process of assembling the members is very complicated. In addition, in a case in which it is necessary to extend the battery pack, it is difficult to modify the structure of the battery pack. Furthermore, a plurality of components is additionally needed, which increases cost of manufacturing the battery pack.

In addition, since the battery pack is configured to have a structure including a plurality of battery modules, the safety and operation efficiency of the battery pack are considerably reduced when overvoltage, overcurrent, or overheat occurs in some of the battery modules. For this reason, it is necessary to provide a means to detect and control overvoltage, overcurrent, or overheat. For example, a safety system, such as a battery management system (BMS), is provided to detect overvoltage, overcurrent, or overheat and to cut off electric current of the battery pack or to operate a cooling apparatus based on the detected overvoltage, overcurrent, or overheat. In this case, however, various sensors and a plurality of wires are further needed in addition to the BMS, cost of manufacturing the battery pack is increased, and the process of manufacturing the battery pack is complicated.

In addition, the BMS is generally mounted in a battery pack case of the battery pack together with unit modules constituting the battery pack. When it is necessary to separate the BMS from the battery pack in order to perform required work, such as inspection, update, or replacement, for the BMS and then to mount the BMS in the battery pack case, it is difficult to perform the separating process or the mounting process since a plurality of component is complicatedly disposed in the battery pack case. Furthermore, the separating process or the mounting process are more complicated due to a plurality of cables, such as a power cable, a sensor cable, and a communication cable, connected to the BMS, and an accident may occur due to work errors during separating process or the mounting process.

Therefore, there is a high necessity for technology that is capable of fundamentally solving the above problems.

DISCLOSURE

Technical Problem

The present invention has been made to solve the above problems and other technical problems that have yet to be resolved.

It is an object of the present invention to provide a battery pack configured to have a structure in which a battery management system (BMS) can be easily separated from and mounted in a battery pack case.

It is another object of the present invention to provide a battery pack that is capable of preventing the occurrence of an accident during BMS separation and mounting processes, thereby improving the safety of the battery pack.

Technical Solution

In accordance with one aspect of the present invention, the above and other objects can be accomplished by the provision of a battery pack configured to have a structure including at least one battery module having a structure in which a plurality of unit cells or a plurality of unit modules, each of which includes a plurality of unit cells, is electrically connected to each other, a battery pack case in which the battery module is received, an inner cartridge for fixing the battery module in the battery pack case, and a battery management system (BMS) assembly including a BMS circuit board for monitoring and controlling operation of the battery pack and a BMS case in which the a BMS circuit board is mounted, the BMS assembly being mounted in the inner cartridge from outside the battery pack in an inserting fashion.

That is, the battery pack according to the present invention is configured to have a structure in which the BMS assembly can be mounted in the inner cartridge in an inserting fashion. Consequently, it is possible to easily mount the BMS assembly in the inner cartridge and to easily separate the BMS assembly from the inner cartridge without disassembling other components, thereby easily performing required work, such as inspection, update, or replacement, for the BMS assembly.

The battery pack case may be formed in a hexahedral shape. For example, the battery pack case may be configured to have a structure including a front plate, a rear plate, an upper plate, a lower plate, and two side plates. One of the plates, which is located in a direction in which the BMS case is mounted, may be detachably coupled to adjacent ones of the plates.

In a concrete example, when one of the plates, which is located in the direction in which the BMS case is mounted, is separated from adjacent ones of the plates, the inner cartridge is exposed to the outside. Consequently, the BMS assembly may be separated from the inner cartridge in order to perform required work, such as inspection, update, or replacement, for the BMS assembly, and then one of the plates, which is located in the direction in which the BMS case is mounted, may be coupled to adjacent ones of the plates.

The BMS case may include a lower cover open at one side thereof such that the BMS circuit board is received in the lower cover and an upper cover for covering the open side of the lower cover. That is, the BMS circuit board may be received in the lower cover through the open side of the lower cover, and then the upper cover covers the open side of the lower cover to safely protect the BMS circuit board from the outside.

The inner cartridge may include a battery module mounting unit, in which the battery module is mounted and fixed, located inside the battery pack case, and a BMS mounting unit, in which the BMS assembly is mounted. An inner sidewall may be provided between the battery module mounting unit and the BMS mounting unit such that the battery module is isolated from the BMS assembly by the inner sidewall.

A BMS fixing part may be formed at the inner sidewall such that, when the BMS assembly is inserted into the inner cartridge, the BMS assembly is fixed to the inner cartridge by the BMS fixing part.

In a concrete example, a rail structure may be formed at the BMS case of the BMS assembly and the BMS fixing part, which is formed at the inner sidewall of the inner cartridge, such that the BMS assembly is coupled into the inner cartridge in a sliding fashion based on the rail structure.

According to circumstances, the BMS assembly may be coupled into the inner cartridge in an inserting fashion without the rail structure formed at the BMS case.

In addition, a cable fixing part for fixing a cable connected to the BMS circuit board may be formed at the BMS fixing part such that a portion of the cable connected to the BMS circuit board is fixed by the cable fixing part or extends through the cable fixing part. When the BMS assembly is separated from or mounted in the inner cartridge, therefore, it is possible to prevent the separating process or the mounting process from being disturbed by the cable.

In addition, a circuit breaker for cutting off electric power of the battery module or the battery pack under control of the BMS circuit board may be mounted to the inner sidewall. When overvoltage, overcurrent, or overheat occurs, the circuit breaker cuts off electric power of the battery pack under control of the BMS.

According to circumstances, a relay or an electronic contactor may be used as a current cut-off device in addition to the circuit breaker.

Meanwhile, the inner cartridge may be provided at a front surface thereof with an insertion hole, through which the BMS assembly is inserted, such that the BMS assembly can be inserted into the inner cartridge through the insertion hole.

The BMS case may further include a fixing plate coupled to the front surface of the inner cartridge at the opposite surface thereof in a direction in which the BMS case is inserted into the inner cartridge. The fixing plate may have a larger area than the insertion hole. When the BMS case is inserted into the inner cartridge, therefore, the fixing plate comes into contact with the inner cartridge to prevent further insertion of the BMS case into the inner cartridge.

In addition, fastening holes may be formed in the fixing plate and the front surface of the inner cartridge corresponding fixing plate such that the fixing plate is coupled to the front surface of the inner cartridge by inserting bolts through the fastening holes. However, the present invention is not limited thereto. For example, the BMS case may be mounted in the inner cartridge by hook fastening, such as snap-fit.

In the above-described structure, the BMS case may be easily coupled into the inner cartridge.

In a concrete example, each of the unit cells may be a single plate-shaped battery cell, or may be a battery cell assembly configured to have a structure in which two or more plate-shaped battery cells are mounted in a cell cover in a state in which electrode terminals are exposed.

For example, the plate-shaped battery cell may be a pouch-shaped battery cell configured to have a structure in which an electrode assembly is mounted in a battery case made of a laminate sheet including a resin layer and a metal layer.

Specifically, the battery cell may be a pouch-shaped battery cell configured to have a structure in which an electrode assembly of a positive electrode/separator/negative electrode structure is contained in a battery case together with an electrolyte in a sealed state. The battery cell may be a plate-shaped battery cell configured to have an approximately rectangular hexahedral structure having a small thickness to width ratio. In general, the pouch-shaped battery cell may include a pouch-shaped battery case. The battery case is configured to have a laminate sheet structure in which an outer coating layer made of a polymer resin exhibiting high durability, a barrier layer made of a metal material blocking moisture or air, and an inner sealant layer made of a thermally bondable polymer resin are sequentially stacked.

The battery case of the pouch-shaped battery cell may be configured to have various structures. For example, the battery case of the pouch-shaped battery cell may be configured to have a structure in which an electrode assembly is received in a receiving part formed at an upper inner surface and/or a lower inner surface of a two-unit member, and the upper and lower contact regions of the outer edge of the battery case are sealed by thermal bonding. The pouch-shaped battery cell with the above-stated construction is disclosed in PCT International Application No. PCT/KR2004/003312, which has been filed in the name of the applicant of the present patent application. The disclosure of the above-mentioned patent application is hereby incorporated by reference as if fully set forth herein. Alternatively, the battery case may be configured to have a structure in which an electrode assembly is received in a receiving part formed at an upper inner surface and/or a lower inner surface of a one-unit member, and the upper and lower contact regions of the outer edge of the battery case are sealed by thermal bonding.

The battery cell is not particularly restricted so long as the battery cell is capable of providing high voltage and high current when a battery module or a battery pack is constituted using the battery cell. For example, the battery cell may be a lithium secondary battery having a large amount of energy storage per volume.

In accordance with another aspect of the present invention, there is provided a device including the battery pack with the above-stated construction.

Specifically, the device may be a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
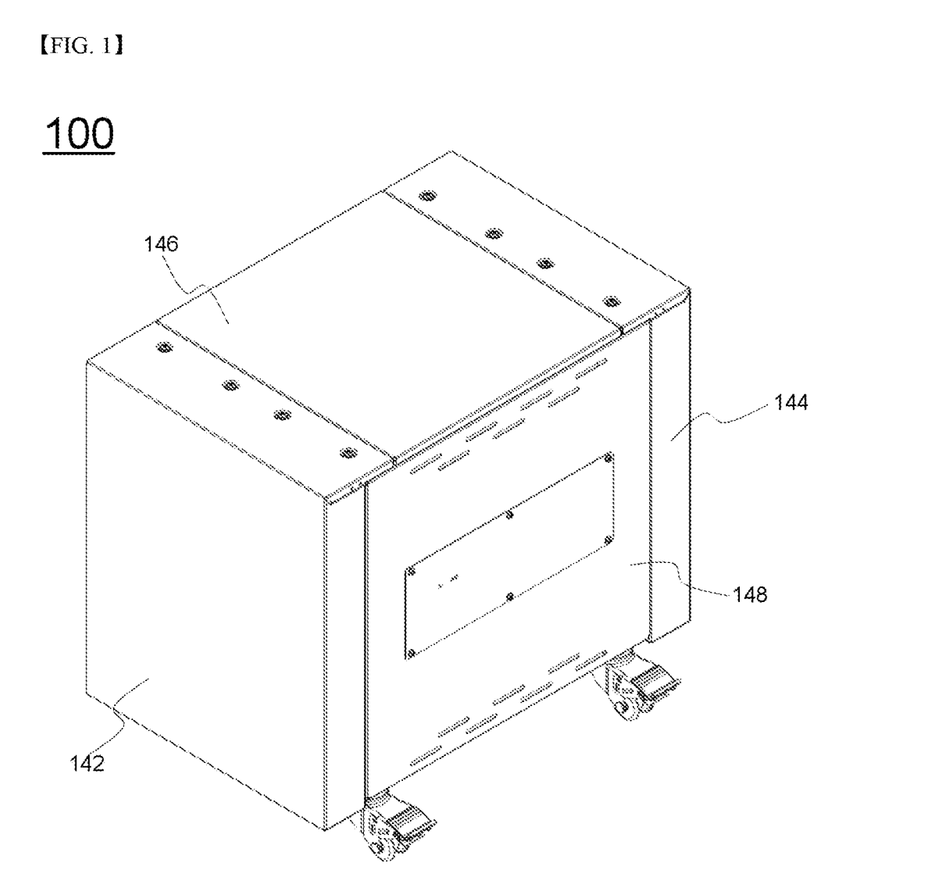
FIG. 1 is a perspective view showing a battery pack according to an embodiment of the present invention.
Figure 2:
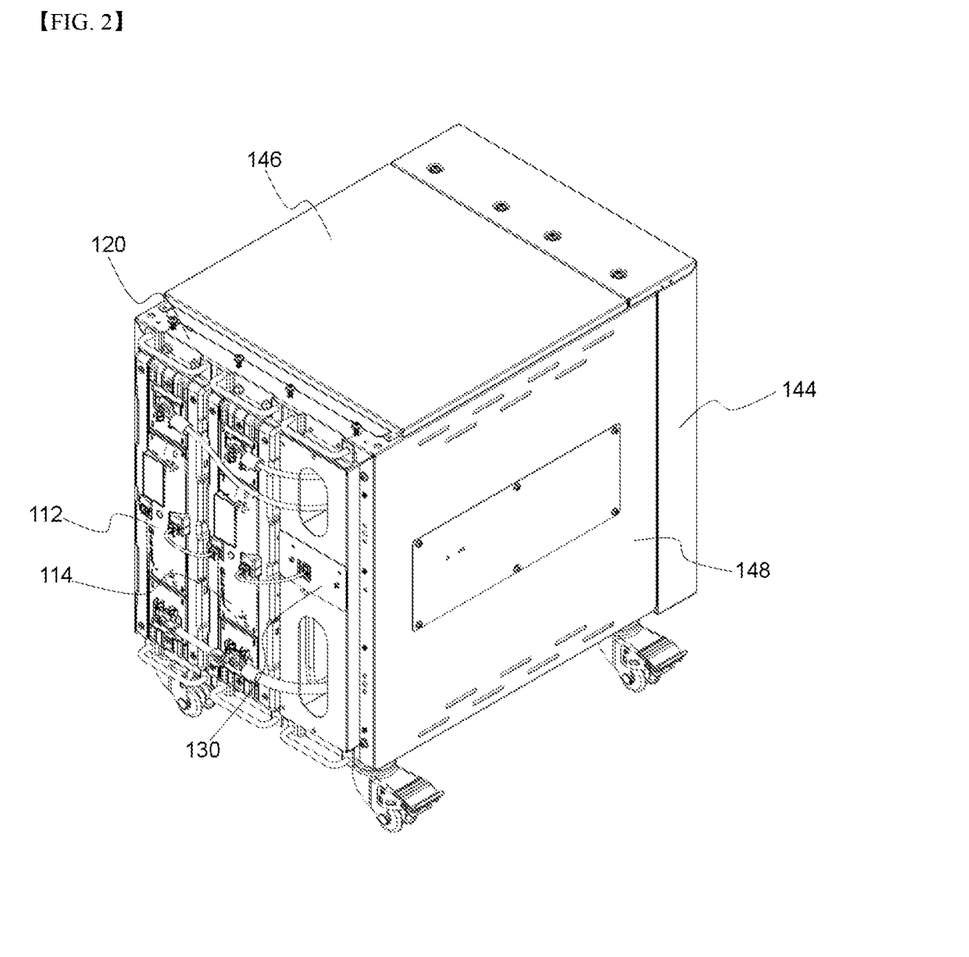
FIG. 2 is a perspective view showing the battery pack with a front plate removed from FIG. 1.

FIG. 1 is a perspective view showing a battery pack according to an embodiment of the present invention, and FIG. 2 is a perspective view showing the battery pack with a front plate removed from FIG. 1.

Referring to FIGS. 1 and 2, a battery pack 100 is configured to have a structure including a first battery module 112, a second battery module 114, an inner cartridge 120, a battery management system (BMS) assembly 130, and a battery pack case.

The battery pack case is formed generally in a hexahedral shape. The battery pack case includes a front plate 142, a rear plate 144, an upper plate 146, two side plates 148, and a lower plate. Of these plates, the front plate 142, which is located in a direction in which the BMS assembly 130 is mounted, is detachably coupled to the upper plate 146 and the side plates 148. Consequently, the BMS assembly 130 may be mounted in the battery pack case, or may be separated from the battery pack case, in a state in which the front plate 142 is removed.

The first battery module 112 and the second battery module 114 are mounted and fixed to the inner cartridge 120. The inner cartridge 120 is provided at one side thereof with an insertion hole 125 (see FIG. 3), through which the BMS assembly 130 is inserted. Consequently, the BMS assembly 130 is mounted through the insertion hole in an inserting fashion.

In addition, when the front plate 142, which is located in the direction in which the BMS assembly 130 is mounted, is separated from the upper plate 146 and the side plates 148, the inner cartridge 120 is exposed to the outside. Consequently, the BMS assembly 130 may be separated from the inner cartridge 120 in order to perform required work, and then the front plate 142 may be coupled to the upper plate 146 and the side plates 148.

Figure 3:
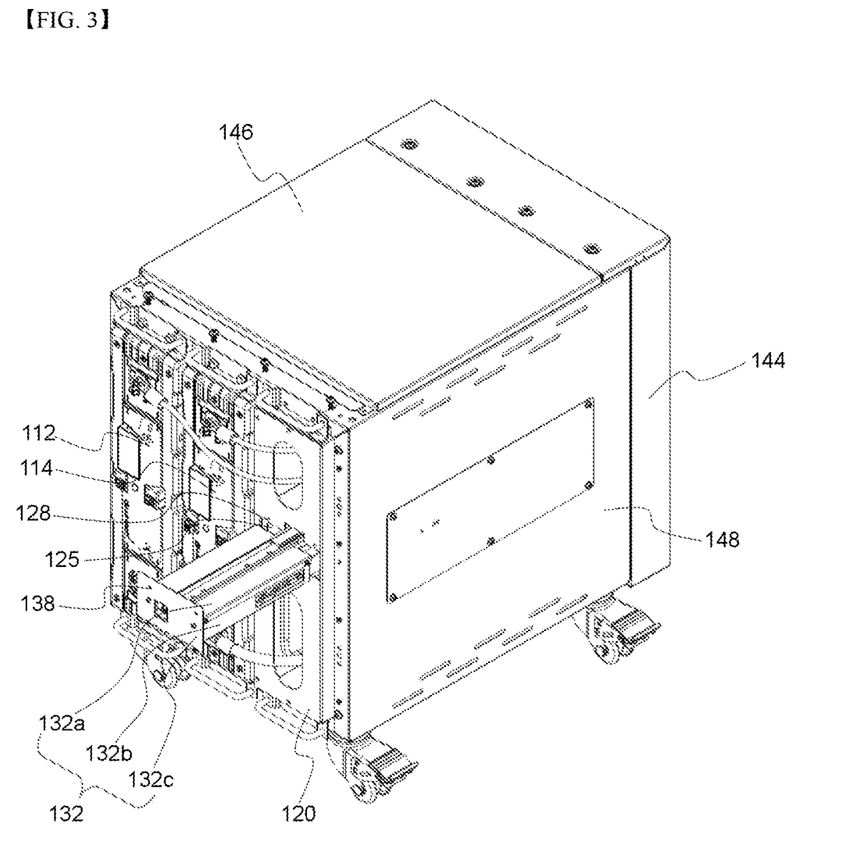
FIG. 3 is a perspective view showing a process of separating a battery management system (BMS) assembly from the structure of FIG. 2.
Figure 4:
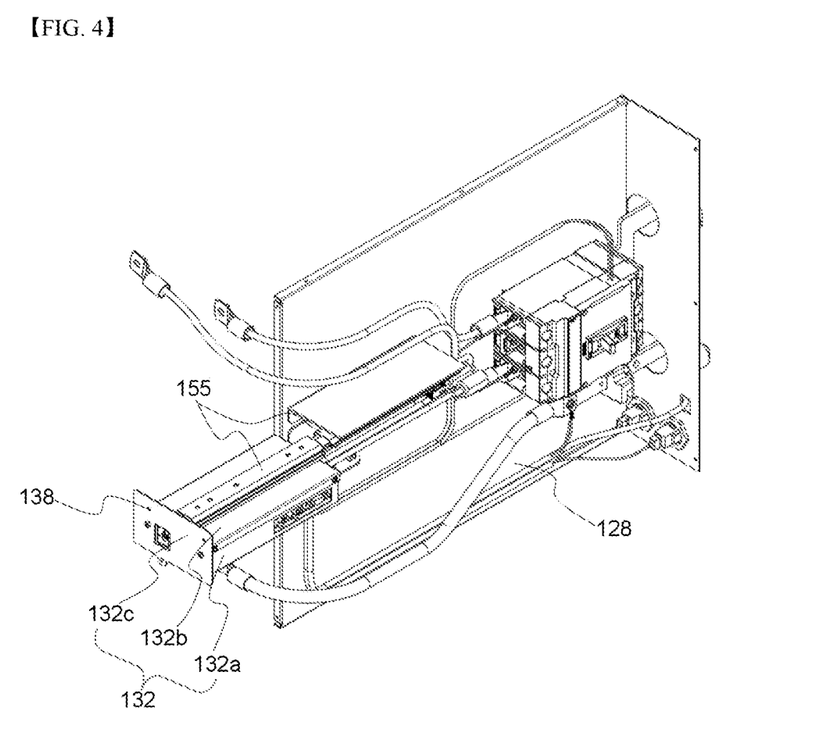
FIG. 4 is a perspective view showing a process of mounting the BMS assembly to an inner sidewall of the battery pack.

FIG. 3 is a perspective view showing a process of separating the BMS assembly from the structure of FIG. 2, and FIG. 4 is a perspective view showing a process of mounting the BMS assembly to an inner sidewall of the battery pack.

Referring to FIGS. 3 and 4 together with FIG. 2, a BMS case 132 is configured to have a structure including a lower cover 132a open at one side thereof such that a BMS circuit board is received in the lower cover 132a, and an upper cover 123b configured to cover the open side of the lower cover 132a. That is, the BMS circuit board is received in the lower cover 132a through the open side of the lower cover 132a, and then the upper cover 123b covers the open side of the lower cover 132a to safely protect the BMS circuit board from the outside.

The BMS case 132 further includes a fixing plate 132c coupled to the front surface of the inner cartridge 120 at the opposite surface thereof in a direction in which the BMS case 132 is inserted into the inner cartridge 120. The fixing plate 132c has a larger area than the insertion hole 125. When the BMS case 132 is inserted into the inner cartridge 120 through the insertion hole 125 of the inner cartridge 120, therefore, the fixing plate 132c comes into contact with the inner cartridge 120 to prevent further insertion of the BMS case 132 into the inner cartridge 120.

In addition, fastening holes 138 are formed in the fixing plate 132c, and fastening holes 128 are formed in the front surface of the inner cartridge 120 corresponding fixing plate 132c. Consequently, the fixing plate 132c is coupled to the front surface of the inner cartridge 120 by inserting bolts through the fastening holes 138 and the fastening holes 128.

Meanwhile, the inner cartridge 120 includes a battery module mounting unit, in which the battery modules 112 and 114 are mounted and fixed, and a BMS mounting unit, in which the BMS assembly 130 is mounted. In addition, an inner sidewall 128 is provided between the battery module mounting unit and the BMS mounting unit such that the battery modules 112 and 114 are isolated from the BMS assembly 130 by the inner sidewall 128.

Figure 5:
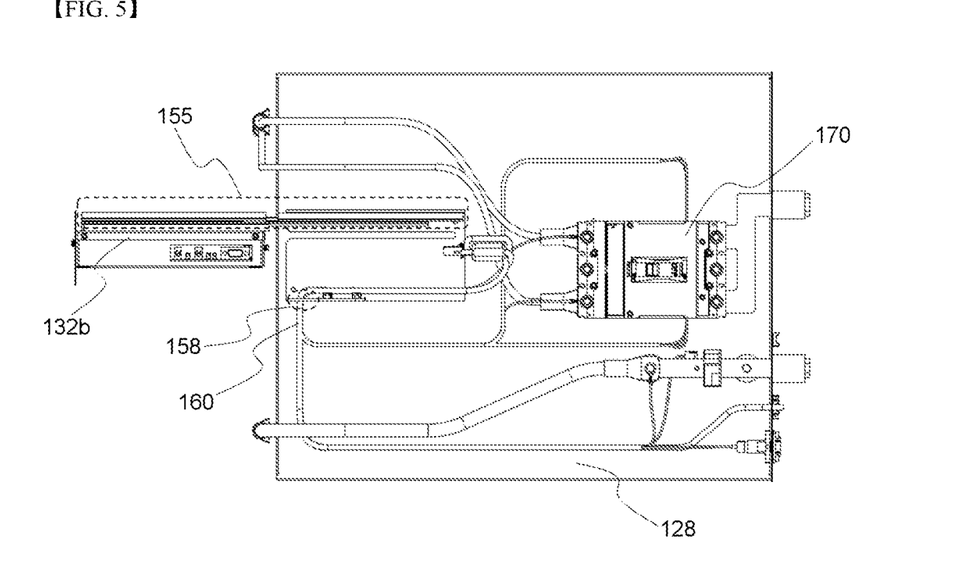
FIG. 5 is a side view of FIG. 4.
Figure 6:
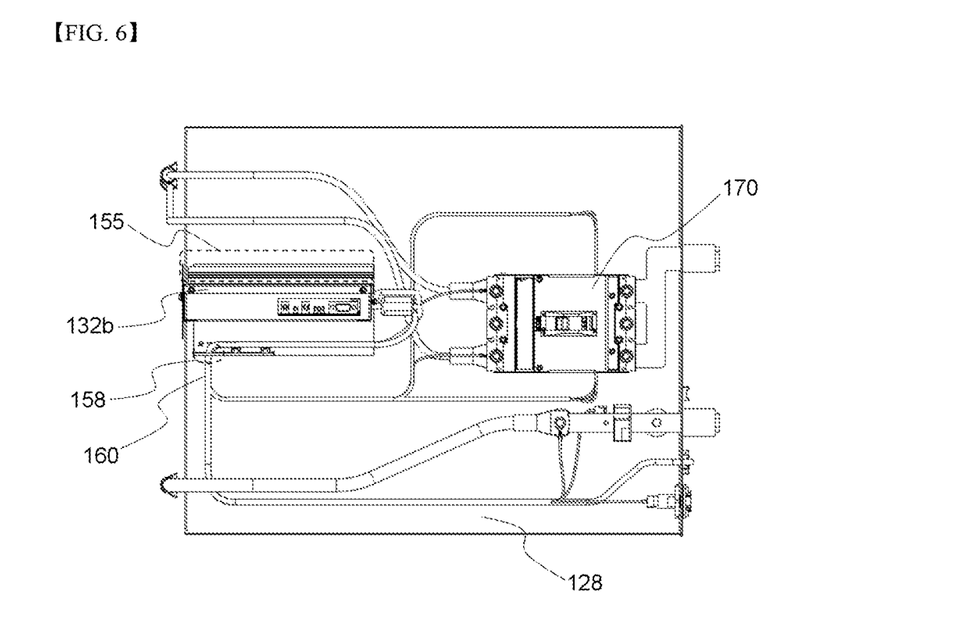
FIG. 6 is a typical view showing a structure in which the BMS assembly is mounted to a BMS fixing part of FIG. 5.

FIG. 5 is a side view of FIG. 4, and FIG. 6 is a typical view showing a structure in which the BMS assembly is mounted to a BMS fixing part of FIG. 5.

Referring to FIGS. 5 and 6 together with FIG. 4, a BMS fixing part 150 is formed at the inner sidewall 128 such that, when the BMS assembly 130 is inserted into the inner cartridge 120, the BMS assembly 130 is fixed to the inner cartridge 120 by the BMS fixing part 150. A rail structure 155 is formed at the upper cover 132b of the BMS case 132 and at the BMS fixing part 150, which is formed at the inner sidewall 128, such that the BMS assembly 130 can be coupled to the BMS fixing part 150, which is formed at the inner sidewall 128 of the inner cartridge 120, in a sliding fashion based on the rail structure 155.

In addition, a cable fixing part 158 for fixing a cable 160 connected to the BMS circuit board is formed at the BMS fixing part 150 such that a portion of the cable 160 connected to the BMS circuit board is fixed by the cable fixing part 158 or extends through the cable fixing part 158. When the BMS assembly 130 is separated from or mounted in the inner cartridge 120, therefore, it is possible to prevent the separating process or the mounting process from being disturbed by the cable 160.

In addition, a circuit breaker 170 for cutting off electric power of the battery modules 112 and 114 or electric power of the battery pack under control of the BMS circuit board is mounted to the inner sidewall 128. When overvoltage, overcurrent, or overheat occurs, the circuit breaker 170 cuts off electric power of the battery pack under control of the BMS.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack according to the present invention is configured to have a structure in which a BMS assembly is mounted in an inner cartridge in an insertion fashion. Consequently, it is possible to easily mount the BMS assembly in the inner cartridge and to easily separate the BMS assembly from the inner cartridge, thereby easily performing various works, such as inspection, update, and replacement, for the BMS assembly.

In addition, in the battery pack according to the present invention, it is possible to prevent the separating process or the mounting process from being disturbed by a cable connected to the BMS assembly when the BMS assembly is separated from or mounted in the inner cartridge, thereby improving the safety of the battery pack.

The invention claimed is:

1. A battery pack configured to have a structure comprising:
   (1) at least two battery modules, each battery module having a structure in which a plurality of unit cells or a plurality of unit modules, each of which comprises a plurality of unit cells, is electrically connected to each other;
   (2) a battery pack case in which the battery modules are received;
   (3) an inner cartridge for fixing the battery modules in the battery pack case; and
   (4) a single battery management system (BMS) assembly comprising
      (4a) a BMS circuit board for monitoring and controlling operation of the battery pack including the battery modules, and
      (4b) a BMS case in which the BMS circuit board is mounted,
   the BMS assembly being mounted in the inner cartridge from outside the battery pack in an inserting fashion, wherein the BMS assembly is removable from the inner cartridge through an insertion hole in the inner cartridge without moving the battery module relative to the inner cartridge, the insertion hole being smaller than a size of one of the battery modules, and
   wherein a front surface of the inner cartridge at a front of the battery pack is positioned in a direction perpendicular to an inserting direction of the BMS assembly and the insertion hole in the inner cartridge is located in the front surface.

2. The battery pack according to claim 1, wherein the battery pack case is formed in a hexahedral shape comprising a front plate, a rear plate, an upper plate, a lower plate, and two side plates, and one of the plates, which is located in a direction in which the BMS case is mounted, is detachably coupled to adjacent ones of the plates.

3. The battery pack according to claim 1, wherein the BMS case comprises a lower cover open at one side thereof such that the BMS circuit board is received in the lower cover and an upper cover for covering the open side of the lower cover.

4. The battery pack according to claim 1, wherein the inner cartridge comprises a battery module mounting unit, in which the battery modules are mounted, and a BMS mounting unit, in which the BMS assembly is mounted, and an inner sidewall is provided between the battery module mounting unit and the BMS mounting unit.

5. The battery pack according to claim 4, wherein a BMS fixing part coupled to the BMS assembly for fixing the BMS assembly is formed at the inner sidewall.

6. The battery pack according to claim 5, wherein a rail structure is formed at the BMS case and the BMS fixing part such that the BMS assembly is coupled into the inner cartridge in a sliding fashion based on the rail structure.

7. The battery pack according to claim 5, wherein a cable fixing part for fixing a cable connected to the BMS circuit board is formed at the BMS fixing part.

8. The battery pack according to claim 4, wherein a circuit breaker for cutting off electric power of the battery modules or the battery pack under control of the BMS circuit board is mounted to the inner sidewall.

9. The battery pack according to claim 4, wherein the inner side wall extends parallel to an inserting direction of the BMS assembly such that the BMS assembly is located on one side of the inner side wall and the battery modules are located on another side of the inner side wall.

10. The battery pack according to claim 1, wherein the BMS case further comprises a fixing plate coupled to the front surface of the inner cartridge at an opposite surface thereof in a direction in which the BMS case is inserted into the inner cartridge.

11. The battery pack according to claim 10, wherein the fixing plate has a larger area than the insertion hole.

12. The battery pack according to claim 10, wherein fastening holes are formed in the fixing plate and a front surface of the inner cartridge such that the fixing plate is coupled to the front surface of the inner cartridge by inserting bolts through the fastening holes.

13. The battery pack according to claim 1, wherein each of the unit cells is a single plate-shaped battery cell or a battery cell assembly configured to have a structure in which two or more plate-shaped battery cells are mounted in a cell cover in a state in which electrode terminals are exposed.

14. The battery pack according to claim 13, wherein the plate-shaped battery cell is configured to have a structure in which an electrode assembly is mounted in a battery case made of a laminate sheet comprising a metal layer and a resin layer, and an outer edge of the battery case is sealed.

15. The battery pack according to claim 13, wherein the plate-shaped battery cell is a lithium secondary battery.

16. A device comprising a battery pack according to claim 1.

17. The device according to claim 16, wherein the device is a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

* * * * *